United States Patent
Kurtz et al.

(10) Patent No.: US 8,555,199 B2
(45) Date of Patent: *Oct. 8, 2013

(54) SYSTEM AND METHOD FOR USER MODIFICATION OF METADATA IN A SHELL BROWSER

(75) Inventors: James Brian Kurtz, Seattle, WA (US); Judson Craig Hally, Sammamish, WA (US); David Joel Sheldon, Seattle, WA (US); David George Devorchik, Seattle, WA (US); Tyler Kien Beam, Redmond, WA (US); Chris J. Guzak, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

This patent is subject to a terminal disclaimer.

(21) Appl. No.: 12/835,411

(22) Filed: Jul. 13, 2010

(65) Prior Publication Data

US 2010/0281390 A1 Nov. 4, 2010

Related U.S. Application Data

(63) Continuation of application No. 10/395,533, filed on Mar. 24, 2003, now Pat. No. 7,823,077.

(51) Int. Cl.
*G06K 15/00* (2006.01)

(52) U.S. Cl.
USPC .......................................... 715/805; 715/792

(58) Field of Classification Search
USPC ......... 715/744–747, 802, 805, 711, 705–710, 715/712, 775, 811, 821–823, 826, 853–855, 715/771, 762, 792, 825; 707/100, 101; 709/230
See application file for complete search history.

(56) References Cited

U.S. PATENT DOCUMENTS

| | | | |
|---|---|---|---|
| 5,065,347 | A | 11/1991 | Pajak et al. |
| 5,721,908 | A | 2/1998 | Lagarde et al. |
| 5,787,413 | A | 7/1998 | Kauffman et al. |
| 5,917,492 | A | 6/1999 | Bereiter |
| 5,982,369 | A | 11/1999 | Sciammarella et al. |

(Continued)

FOREIGN PATENT DOCUMENTS

| | | |
|---|---|---|
| CN | 1239239 A | 12/1999 |
| EP | 1089196 | 1/2001 |

(Continued)

OTHER PUBLICATIONS

European Supplemental Search Report, EP 05 77 6529, mailed Aug. 29, 2012, 12 pages.

(Continued)

*Primary Examiner* — Steven Sax
(74) *Attorney, Agent, or Firm* — Shook Hardy & Bacon LLP (57) ABSTRACT

A system and method for user modification of metadata in a shell browser. A group of items and associated metadata values are displayed in a window of the shell browser. An edit control permits user modification of metadata values displayed in the window. The user can modify metadata associated with a welcome pane, a selected item, or multiple selected items. A data structure stored on one or more computer-readable media contains metadata associated with items displayed in a shell browser, including user modifiable metadata which is also displayed in the shell browser.

17 Claims, 9 Drawing Sheets

(56) References Cited

U.S. PATENT DOCUMENTS

| | | |
|---|---|---|
| 6,185,574 B1 | 2/2001 | Howard et al. |
| 6,247,020 B1 | 6/2001 | Minard |
| 6,317,777 B1 | 11/2001 | Skarbo et al. |
| 6,356,908 B1 | 3/2002 | Brown et al. |
| 6,370,518 B1 | 4/2002 | Payne et al. |
| 6,374,260 B1 | 4/2002 | Hoffert et al. |
| 6,385,641 B1 | 5/2002 | Jiang et al. |
| 6,484,205 B1 | 11/2002 | Byford |
| 6,496,837 B1 | 12/2002 | Howard et al. |
| 6,573,906 B1 * | 6/2003 | Harding et al. ............... 715/705 |
| 6,725,227 B1 | 4/2004 | Li |
| 6,762,777 B2 * | 7/2004 | Carroll ............ 715/808 |
| 6,869,018 B2 | 3/2005 | Fifield |
| 6,938,207 B1 * | 8/2005 | Haynes ............ 715/711 |
| 6,966,033 B1 | 11/2005 | Gasser et al. |
| 6,973,618 B2 | 12/2005 | Shaughnessy et al. |
| 7,171,468 B2 | 1/2007 | Yeung et al. |
| 7,191,195 B2 | 3/2007 | Koyama et al. |
| 7,191,422 B1 | 3/2007 | Tourancheau et al. |
| 7,484,183 B2 | 1/2009 | Look |
| 7,555,722 B2 | 6/2009 | Karatal et al. |
| 7,590,625 B1 | 9/2009 | Tennican et al. |
| 7,692,807 B1 | 4/2010 | Sanders et al. |
| 7,769,752 B1 | 8/2010 | Turner et al. |
| 7,823,077 B2 * | 10/2010 | Kurtz et al. ............ 715/771 |
| 7,853,890 B2 | 12/2010 | Miner et al. |
| 7,890,543 B2 | 2/2011 | Hunt et al. |
| 7,917,538 B2 | 3/2011 | Gurevich |
| 2002/0049777 A1 | 4/2002 | Terayama et al. |
| 2002/0059288 A1 | 5/2002 | Yagi |
| 2002/0078035 A1 | 6/2002 | Frank et al. |
| 2002/0105548 A1 | 8/2002 | Hayton et al. |
| 2002/0156792 A1 | 10/2002 | Gombocz et al. |
| 2003/0050927 A1 | 3/2003 | Hussam |
| 2003/0110397 A1 | 6/2003 | Supramaniam et al. |
| 2003/0156119 A1 | 8/2003 | Bonadio |
| 2004/0066410 A1 | 4/2004 | Lindhorst et al. |
| 2004/0085364 A1 * | 5/2004 | Keely et al. ............. 345/804 |
| 2004/0146272 A1 | 7/2004 | Kessel et al. |
| 2004/0162838 A1 | 8/2004 | Murayama et al. |
| 2004/0168118 A1 * | 8/2004 | Wong et al. ............. 715/500.1 |
| 2004/0177319 A1 * | 9/2004 | Horn ............ 715/501.1 |
| 2005/0066289 A1 | 3/2005 | Leah et al. |
| 2005/0091612 A1 | 4/2005 | Stabb et al. |
| 2005/0114330 A1 | 5/2005 | Chau |
| 2005/0131760 A1 | 6/2005 | Manning et al. |
| 2005/0216825 A1 | 9/2005 | Teague |
| 2005/0216886 A1 | 9/2005 | Washburn |
| 2005/0240489 A1 | 10/2005 | Lambert |
| 2006/0143205 A1 | 6/2006 | Fuchs |
| 2008/0208927 A1 | 8/2008 | Chikusa et al. |

FOREIGN PATENT DOCUMENTS

| | | |
|---|---|---|
| JP | 2004362745 | 12/1992 |
| JP | 07-129448 | 5/1995 |
| JP | 11-212842 | 8/1999 |
| JP | 2000-242655 | 9/2000 |
| JP | 2000348049 | 12/2000 |
| JP | 2004133796 | 10/2002 |
| JP | 2004046870 | 2/2004 |
| NO | 20042743 A | 8/2004 |
| WO | 2004008348 A1 | 1/2004 |

OTHER PUBLICATIONS

Johnson B, et al., "Tree-maps: a space-filling approach to the visualizaton of hierachiacal information structures", Visualization, 1991, 8 pages.

* cited by examiner

SYSTEM AND METHOD FOR USER MODIFICATION OF METADATA IN A SHELL BROWSER

CROSS-REFERENCE TO RELATED APPLICATIONS

This application is a continuation application of U.S. patent application Ser. No. 10/395,533, which was filed on Mar. 24, 2003. U.S. patent application Ser. No. 10/395,533 is incorporated herein in its entirety.

STATEMENT REGARDING FEDERALLY SPONSORED RESEARCH OR DEVELOPMENT

None.

TECHNICAL FIELD

The present invention relates generally to the field of computer software. More particularly, the invention relates to a system and method for providing an improved user experience within a shell or file system browser so that users can more readily identify an item based on the metadata associated with that item.

BACKGROUND OF THE INVENTION

The need to readily identify items stored in a computing environment such as a personal computer (PC) is dramatically increasing as more individuals utilize computers in their daily routines and as the type of stored information varies between pictures, music, documents, etc. Documents and media are typically stored on computers in a hierarchical fashion and are organized with files of information or media stored within folders. File system browsers enable users to navigate through the file system and locate and open files and folders. For example, Microsoft Corporation's WINDOWS® EXPLORER™ is an operating system utility which enables users to browse the file system.

Many users find it difficult to correctly identify a file based on the information currently available in conventional file system browsers. Of course the contents of a file can be verified by opening it with an application program, but this method of browsing files is extremely inefficient. The ability to view metadata about a file within a file system browser can greatly assist a user in identifying a particular file without having to open it. In Microsoft Corporation's WINDOWS® 9X operating systems, for example, a user can view object metadata by accessing the property sheet for a particular object. A property sheet presents the user with a list of the attributes or settings of an object in the form of a tabbed, index-card-like selection of property pages, each of which features standard dialog-style controls for customizing parameters. However, using the property sheet to locate an item can be slow and cumbersome, and some users find it difficult to locate the relevant metadata in a property sheet. Similarly, the use of infotips to locate an item can be slow and cumbersome because a user must hover the mouse over each file in order to view the limited metadata displayed in an infotip.

Conventional file system browsers do not allow users to enter and edit metadata relating to files and folders, which would significantly enhance a user's ability to later locate a file. To date, the ability of users to enter and edit metadata has been limited to special purpose software programs. For example, media players for electronic music files present users with the ability to edit metadata associated with music albums and artists. Another example of such programs includes application programs for electronic picture files. However, the utility of media players and other such programs is limited to the particular type of file supported by the program, as opposed to a general purpose file system browser which supports multiple file types.

Microsoft Corporation's WINDOWS® XP operating system includes an image browser for use in the My Pictures folder. The My Pictures folder is endowed with special features which enable users to view pictures as photos, not just as document icons. My Picture's image browsing features include the ability to view thumbnail-size and large versions of photos, rotate photos that are sideways, and create a slide show. A user can also view a photo's details, such as its dimensions, the date and time it was taken, and the name of the camera that took it. The preview control area in the My Picture's folder contains an enlarged preview image of a user-selected image, iterator buttons to assist a user in iterating through a series of pictures and controls for rotating pictures in a clockwise or counterclockwise direction. While the image browsing features in WINDOWS® XP have advanced the state of the art by alleviating the need to invoke an application program to view and manipulate pictures, users still cannot enter and edit metadata associated with the pictures.

Accordingly, there is a need for an improved user experience within a shell or file system browser which enables users to readily locate an item based on the metadata associated with that item. There is also a need for a system and method which allow users to enter and edit metadata associated with items of various types within a shell browser without the need to invoke an application program.

SUMMARY OF THE INVENTION

The present invention meets the above needs and overcomes one or more deficiencies in the prior art by providing a system and method for user modification of metadata in a shell browser. In one aspect of the present invention, a shell browser is provided which includes a window and an edit control. The window displays a group of items and also displays metadata values associated with one or more of the displayed items. The edit control permits user modification of at least a portion of the metadata values displayed in the window.

Another aspect of the present invention is a graphical user interface embodied on a computer-readable medium and executable on a computer. The graphical user interface includes a first screen area which displays a set of items in a shell browser and a second screen area which displays metadata associated with one or more of the displayed items. The graphical user interface also presents the user with means within the shell browser for modifying the displayed metadata.

In a further aspect of the present invention, computer-implemented methods are provided for enabling a user to modify metadata within a shell browser. One such method includes displaying a plurality of items, receiving a first input from the user representing a selection of at least one displayed item, displaying metadata associated with the selected item(s) and providing an edit control for user modification of the displayed metadata. Another such method includes displaying a welcome pane and metadata associated with the welcome pane and providing an edit control for user modification of the displayed metadata.

Still another aspect of the present invention is a data structure containing metadata associated with one or more items displayed in a shell browser. The data structure, which is stored on one or more computer-readable media, includes a field containing user modifiable metadata associated with the one or more displayed items, and the user modifiable metadata contained in the data structure is also displayed in the shell browser.

BRIEF DESCRIPTION OF THE DRAWING

The present invention is described in detail below with reference to the attached drawing figures, wherein.

DETAILED DESCRIPTION OF THE INVENTION

The present invention relates to a system and method for providing an improved user experience within a shell browser so that users can more readily identify an item based on the metadata associated with that item. An exemplary operating environment for the present invention is described below.

Figure 1:
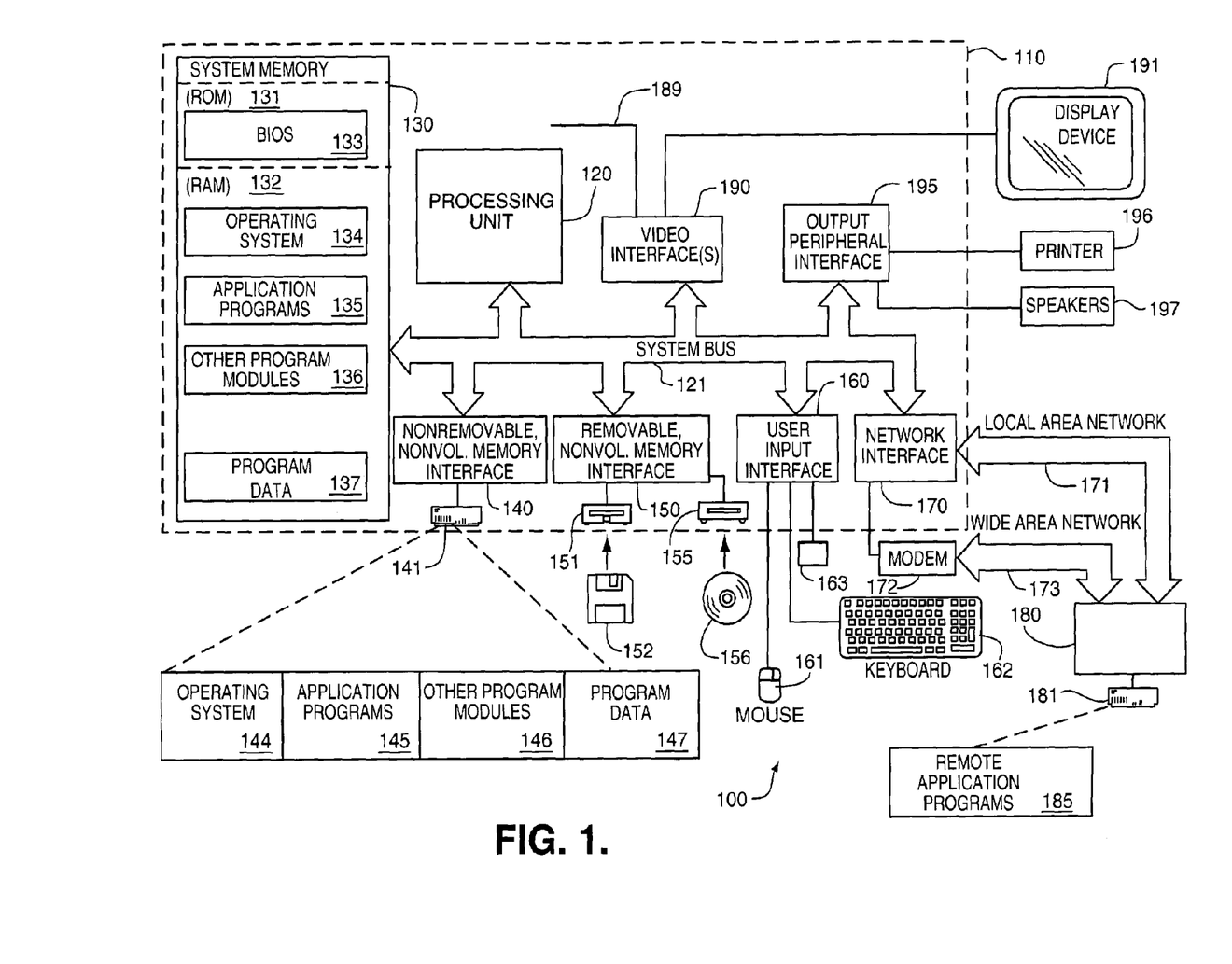
FIG. 1 is a block diagram of a computing-system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. The invention may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory 130 to the processing unit 120.

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnections are well-known. For example, including various expansion cards such as television-tuner cards and network-interface cards within a computer 110 is conventional. Accordingly, additional details concerning the internal construction of the computer 110 need not be disclosed in connection with the present invention.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

As previously mentioned, the present invention may be described in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

Figure 2A:
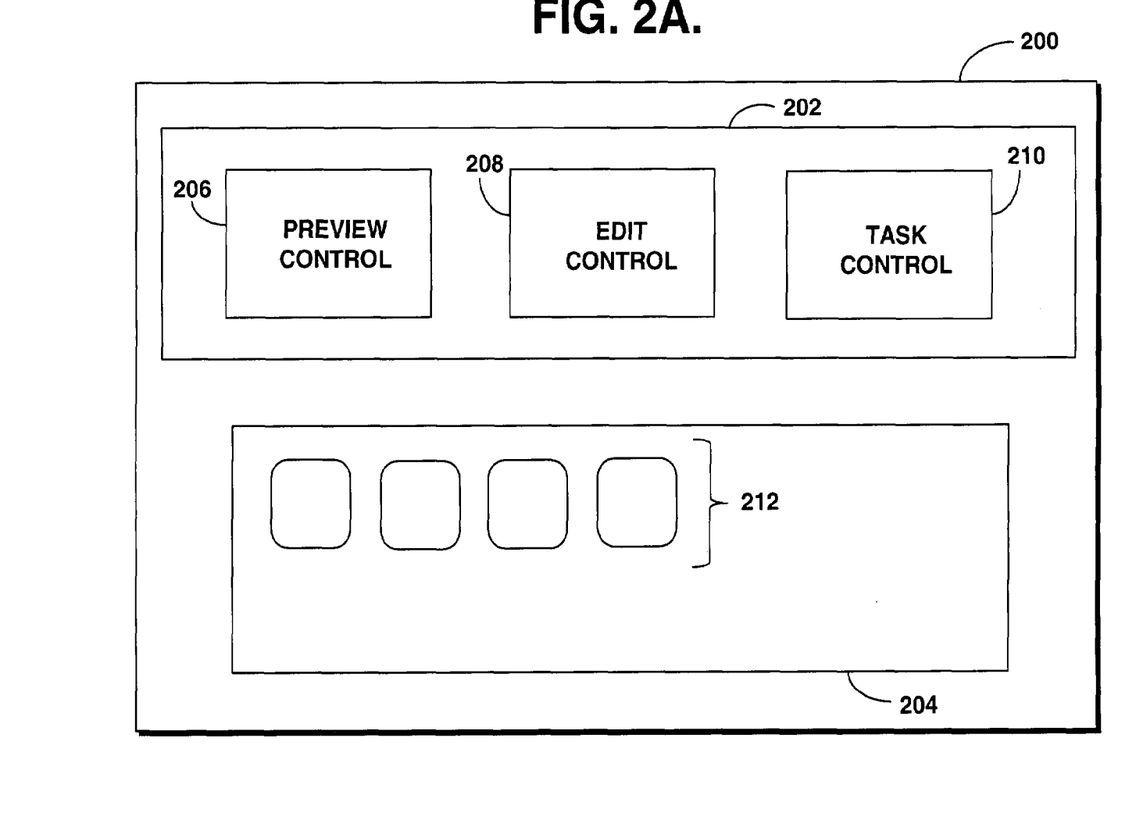
FIG. 2A is a block diagram of an exemplary graphical user interface for a shell browser having an edit control in accordance with an embodiment of the present invention.

Turning to FIG. 2A, a window 200 represents a screen-size display area for a graphical user interface of a shell browser. The window 200 contains a preview pane area 202 and a view area 204. The preview pane 202 may include a preview control 206, a user interface (UI) or edit control 208, and a task control 210. Typically, the preview control 206 will provide the user with an image or other visual display of the item being previewed (e.g., a selected file). The preview control 206 may also present the user with controls such as iterator buttons which allow the user to shift the focus from one item to the next by clicking a mouse button. Metadata corresponding to one or more items and/or metadata corresponding to the item container may be displayed in a variety of locations within the window 200. For example, the edit control and metadata may be co-located within edit control area 208 so that the edit control area not only includes a display of key properties of the previewed item but also presents the user with the option of making edits to the metadata. The task control 210 contains tasks relevant to the namespace and/or the selection.

For purposes of the present invention, the terms "metadata" and "user modifiable metadata" exclude the shell item name. The term "shell item name" refers to the property which is used for purposes of sorting and displaying the item within the shell browser. As mentioned above, one unique aspect of the present invention is the ability of a user to edit metadata within a shell browser.

Those skilled in the art will appreciate that the present invention contemplates the presence of optional features within the window 200. For example, the preview control 206 and the task control 210 are not essential features for purposes of the present invention. Moreover, other non-essential features which are not shown in FIG. 2A, such as a toolbar which includes iterator buttons or a show/hide button so the user can open/close the preview pane, are also within the scope of the present invention. Nevertheless, these and other optional features may assist the user in readily locating a particular item in the shell browser.

The view area 204 provides a listview of one or more items 212, such as file system files or folders. The term "listview"

refers to an enumeration or list of items within a container. The terms "item" and "shell item" are used interchangeably herein to refer to files, folders and other such containers, and other non-file objects which can be represented in a listview. Examples of non-file objects may include, but would not be limited to, contacts, favorites and email messages. The terms "shell browser" and "file system browser" are used interchangeably herein to refer to a browser which allows a user to navigate through various namespaces including files and other non-file items.

Those skilled in the art will appreciate that the present invention contemplates many possible designs and layouts for the window 200. For example, the preview pane 202 is shown above the view area 204 in FIG. 2A. However, other layouts, such as placing the preview pane 202 and the view area 204 side-by-side, are clearly within the scope of the present invention. The location of the edit control 208 is also independent of the location of the displayed metadata and independent of the location of any other controls. There are also many possible view types for the items depicted in listview area 204, such as details, slide show, filmstrip, thumbnail, tiles, icons, etc.

Figure 2B:
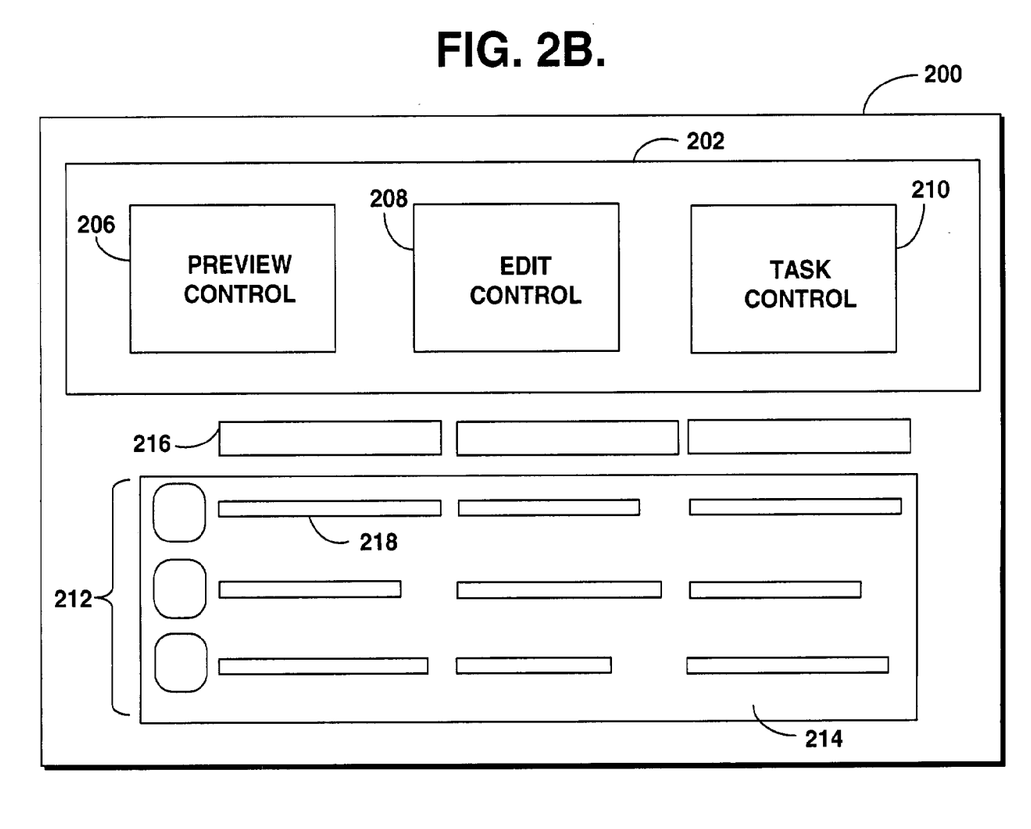
FIG. 2B is a block diagram of an exemplary graphical user interface for a shell browser having one or more edit controls in accordance with an embodiment of the present invention.

FIG. 2B is similar to FIG. 2A, except that the view area 204 is replaced by a view area 214 which displays the items 212 in details mode. As is typical for shell items displayed in details mode, the items 212 are aligned in a column at the left-hand side of view area 214, and one or more column headings 216 form the top row of a set of columns containing metadata 218 relating to the corresponding item located in the same row. Importantly, the present invention contemplates the ability of a user to explicitly change a metadata value to another value through instantiation of one or more edit controls 208 anywhere within the window 200. For example, an edit control may be provided within the preview pane 202 and/or within the view area 214. For example, an edit control which is not initially visible to a user may be provided within the view area 214. Such a control can be instantiated, for example, when the user hovers over the metadata 218 and then clicks on it to enter an editing mode.

Figure 3:
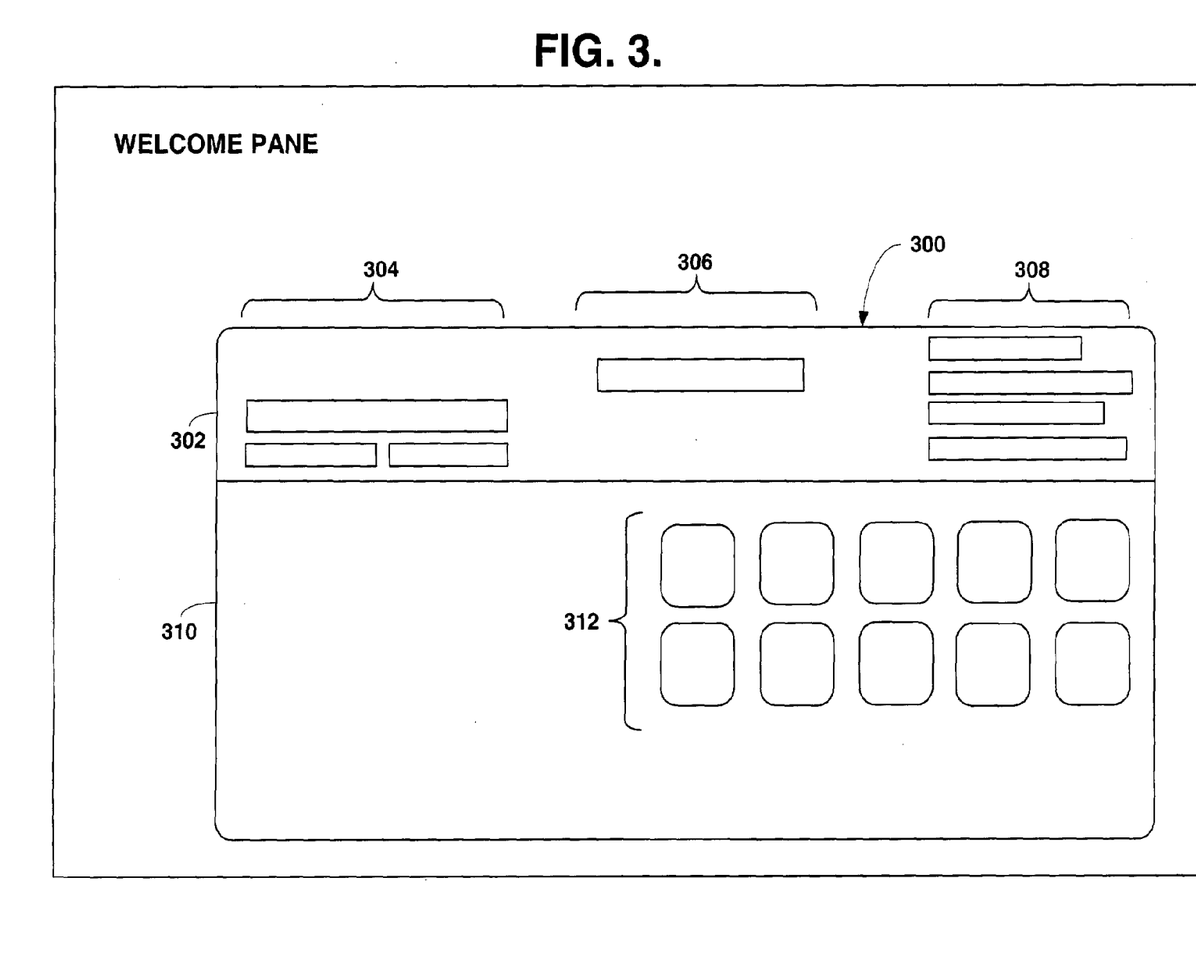
FIG. 3 is a schematic diagram of a welcome pane in a shell browser.

Referring next to FIG. 3, a schematic illustration is provided of a welcome pane 300 in a shell browser. A welcome pane is sometimes referred to as a "null select" pane because it represents a namespace or container as opposed to a selection. If the user has not yet made a selection, a preview pane 302 displays metadata 304 and key tasks relating to the folder or shell library. If desired, the tasks may be separated into premiered tasks 306 and other relevant tasks 308. The welcome pane 300 also includes a view area 310, in which multiple files or other items 312 may be viewed. The welcome pane metadata 304 may include information such as properties of the container (e.g., MyPictures), in which case the metadata display may be static. Alternatively, the welcome pane metadata 304 may include information such as a sampling of metadata from each of the items within the container, in which case the metadata display may change frequently. For example, the metadata display may be limited to properties of one item at a time by cycling from one item to the next every 30 seconds.

Figure 4:
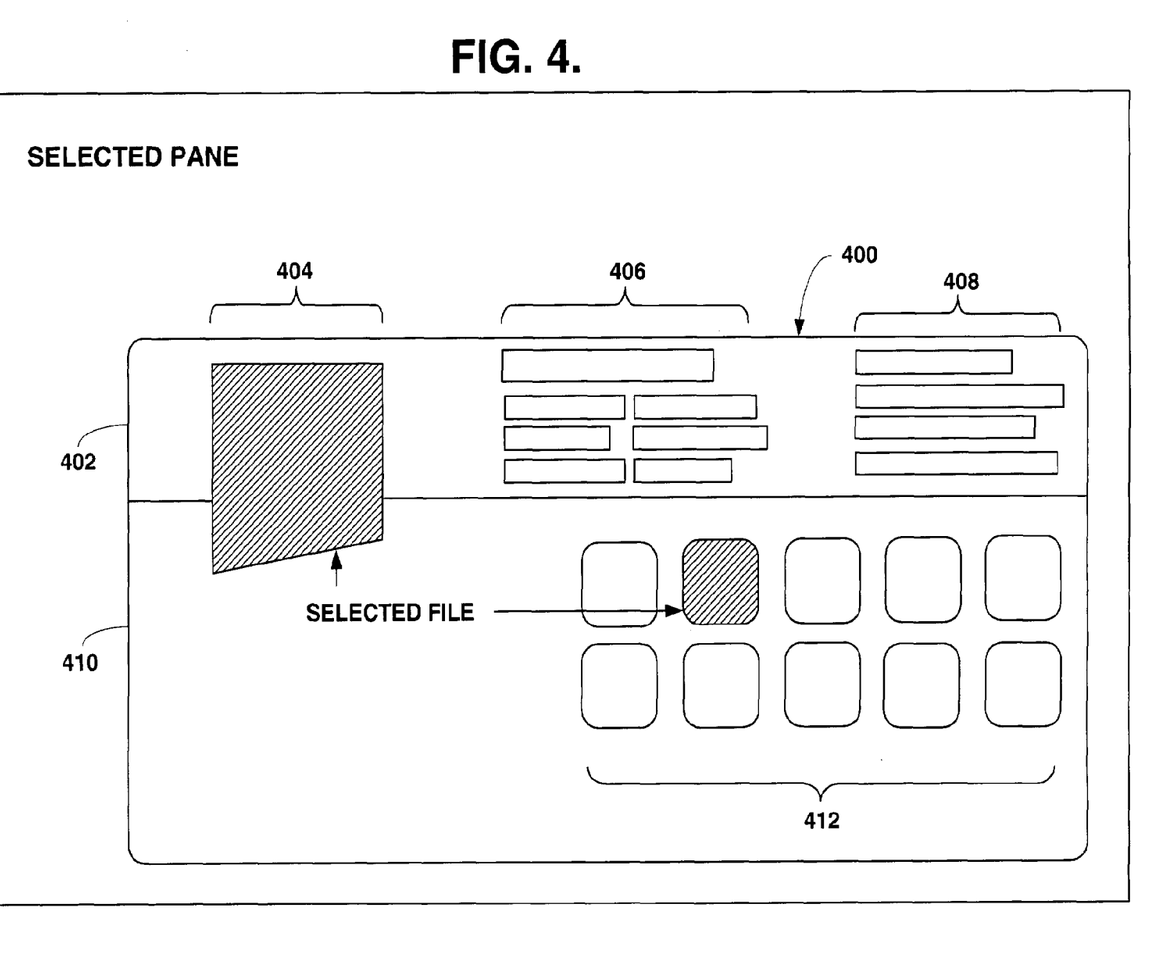
FIG. 4 is a schematic diagram of a selected pane in a shell browser.

FIG. 4 is a schematic illustration of a selected pane 400 in a shell browser. As opposed to a welcome pane, a selected pane represents a selection by the user. If the user selects a container or folder, the selected pane need not be identical to the welcome pane for that container or folder. In FIG. 4, the selected pane 400 includes a preview pane 402 which contains a preview control 404, a metadata display 406 and a tasks display 408. Like the welcome pane 300 (in FIG. 3), the selected pane 400 also includes a view area 410, in which multiple files or other items 412 may be viewed. In FIG. 4, however, the user has selected one of the files. Consequently, the preview control 404 displays a preview image of the selected file, the metadata display 406 shows properties of the selected file, and the tasks display 408 provides a menu of relevant tasks for operating on the selected file.

Figure 5:
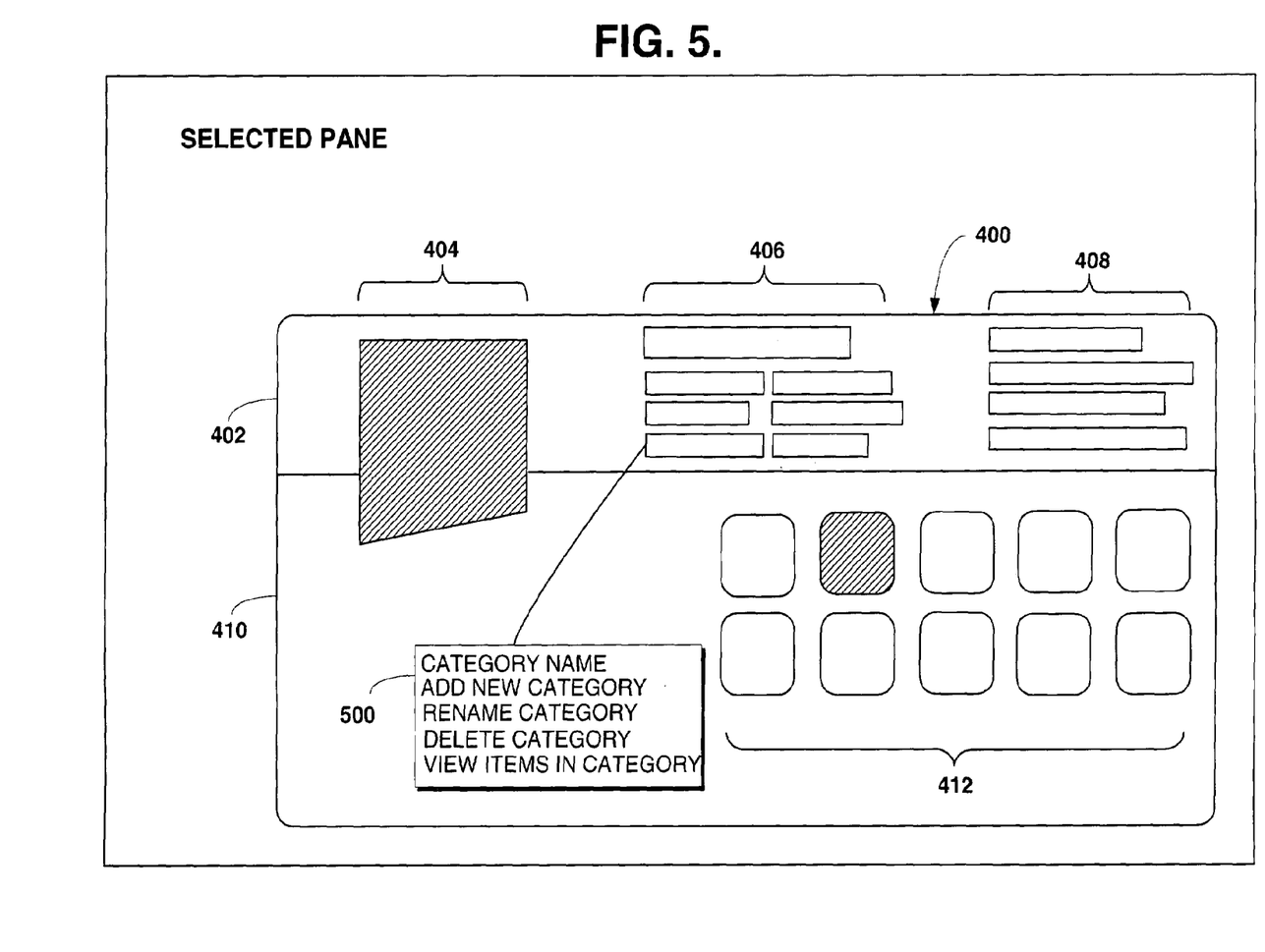
FIG. 5 is a schematic diagram of the selected pane of FIG. 4 including a context menu enabling a user to modify metadata in a shell browser in accordance with an embodiment of the present invention.

FIG. 5 is a schematic representation of the selected pane of FIG. 4 but which also includes a context menu 500 to enable a user to modify metadata in a shell browser in accordance with an embodiment of the present invention. The context menu 500 in FIG. 5 presents the user with several options for changing the selected metadata. The generic text shown in the menu 500 is of course merely one example of the type of options which may be presented to a user for editing the displayed metadata. A context menu can be provided in any window, including a welcome pane, to improve the user experience. As those skilled in the art will appreciate, any number and variety of context menus could be supported by the present invention. For purposes of the present invention, one means for enabling user modifications to displayed metadata within a shell browser is to provide a context menu such as editable metadata context menu 500. A user may summon the context menu, for example, by clicking on the corresponding text or object in the preview pane.

Those skilled in the art will appreciate that the present invention contemplates means other than context menus for enabling user modifications to displayed metadata within a shell browser. Another such means for is for the user to click on the metadata to enter an editing mode. By contrast, a user could enter an editing mode by hovering over the relevant text or object in the preview pane. Numerous alternative means are available and within the scope of the present invention.

Figure 6:
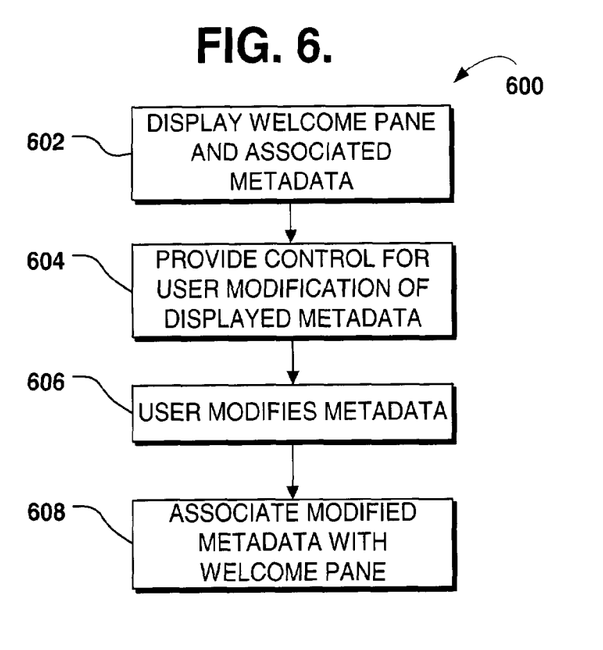
FIG. 6 is a flow diagram illustrating a method for enabling a user to modify metadata displayed in a welcome pane within a shell browser in accordance with an embodiment of the present invention.

FIG. 6 is a flow diagram illustrating a method 600 for enabling a user to modify metadata displayed in a welcome pane within a shell browser in accordance with an embodiment of the present invention. The method 600 includes displaying a welcome pane and metadata associated with the welcome pane at 602. Then, at 604, the method provides a control for user modification of the displayed metadata. When the user manipulates the control to modify the displayed metadata at 606, the method then associates the modified metadata with the welcome pane at 608 so that the modified metadata will be displayed the next time the welcome pane is displayed.

Figure 7:
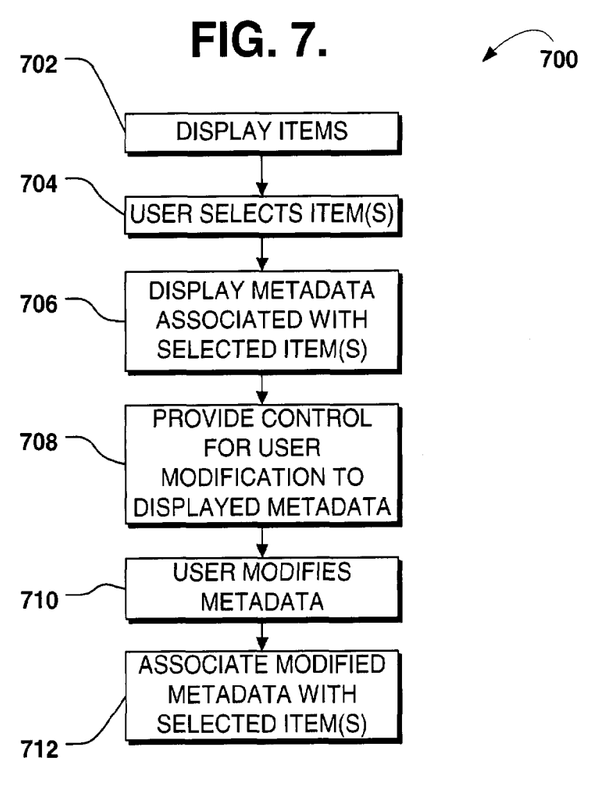
FIG. 7 is a flow diagram illustrating a method for enabling a user to modify metadata displayed in a selected pane within a shell browser in accordance with an embodiment of the present invention.

FIG. 7 is a flow diagram illustrating a method 700 for enabling a user to modify metadata displayed in a selected pane within a shell browser in accordance with an embodiment of the present invention. At 702, the method 700 first displays a number of items, such as items in a welcome pane or items in a selected container. When the user selects one or more of the items at 704, the method displays metadata associated with the selected item(s) at 706. At 708, the method provides a control for user modification of the displayed metadata. When the user manipulates the control to modify the displayed metadata at 710, the method then associates the modified metadata with the selected item(s) at 712 so that the modified metadata will be displayed the next time the selected item(s) is/are displayed.

In the event a user selects multiple items at 704, the displayed metadata may include intersecting properties of the selected items, a union of properties, or perhaps a new property relevant to the selected items. Alternatively, the displayed metadata may include a rotating sample of metadata from each of the selected items (e.g., cycling from one selected item's metadata to the next selected item's metadata every 30 seconds). It is possible for the display of metadata which would result from a selection of all of the items to be identical to the display of metadata which would result from a null select.

Figure 8:
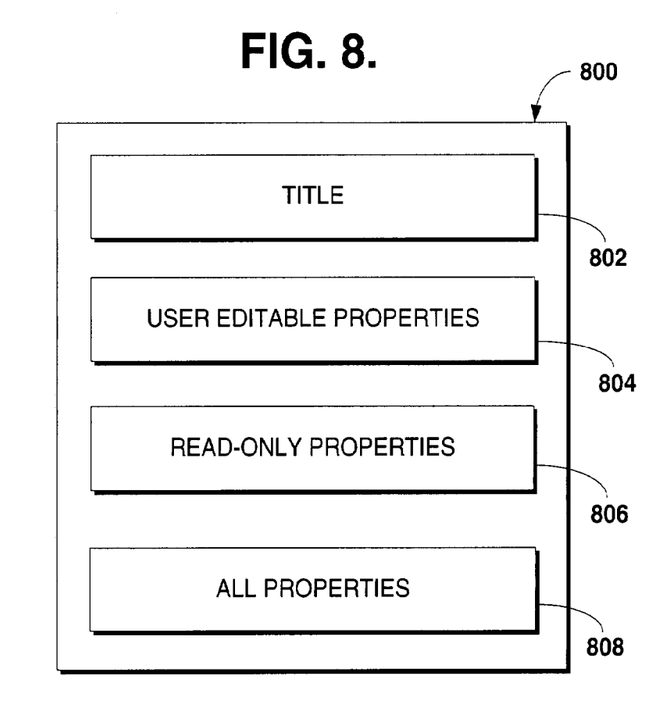
FIG. 8 is a block diagram of a data structure containing user modifiable metadata associated with an item displayed in a shell browser.

FIG. 8 is a block diagram of a data structure 800 containing user modifiable metadata associated with an item displayed in a shell browser. The data structure 800 includes a title field 802 which indicates the name of the item. In the case of non-file items, the title field 802 may contain the name of whatever property is used to alphabetize that item in a list-view. The data structure 800 includes a user editable properties field 804 containing one or more properties associated with the displayed item, wherein the user editable properties are displayed in the shell browser with the displayed item. The data structure 800 may optionally include a read-only properties field 806 which contains any read-only properties associated with the displayed item and worthy of display in the shell browser. Given the size constraints of the metadata display in the shell browser, the number of properties in fields 804 and 806 may be limited. Consequently, the data structure 800 may optionally include an all properties field 808, which contains a link or pointer to a location (e.g., a property page) which contains all of the properties or metadata associated with the displayed item. Of course, the all properties field 808 would not be necessary in the event that fields 804 and 806 contain all of the properties associated with the displayed item. The data structure 800 is stored on one or more computer-readable media, such as in a file system or shell, to provide rich storage views, and thus an improved user experience, within the shell browser.

The present invention enables a number of scenarios which were not possible with conventional shell browsers. As a first example, a student can manage her projects using the preview pane. When she obtains new documents as part of a project she is working on, she can select those documents in her document library and enter the name of the document author and the name of the project into keyword fields using the edit control. Now the new documents will show up in her favorite view: "Documents Grouped by Keyword and Listed by Author." A second example of a new scenario enabled by the present invention involves an employee looking for materials for an upcoming ad campaign. As he browses through his employer's stock collection of photos using the shell browser, he selects a couple of pictures and, from the preview pane, adds a new keyword "Summer 2003 Campaign." Having updated the metadata for a multiple selection, the employee then pivots by keyword and can view all of the "Summer 2003 Campaign" files grouped together. Many other scenarios which take advantage of the present invention would be apparent to those skilled in the art.

Alternative embodiments and implementations of the present invention will become apparent to those skilled in the art to which it pertains upon review of the specification, including the drawing figures. Accordingly, the scope of the present invention is defined by the appended claims rather than the foregoing description.

What is claimed is:

1. A computer-implemented method for enabling a user to modify metadata within an operating-system browser, the method comprising:
    displaying an operating-system shell browser window that is divided into at least two panes, wherein a first pane displays a plurality of graphical items representing a plurality of files stored in a computing system;
    receiving a selection of an item that is presented in the operating-system shell browser and that represents one of the plurality of files stored in the computing system;
    displaying, in a second pane, application-neutral metadata associated with at least the item that was selected; and
    providing a context menu that is displayed in front of the operating-system shell browser window and that permits, without opening an application running in the operating system, user modification of the application-neutral metadata, wherein application-neutral metadata that is modified is available to subsequent requesting applications.

2. The computer-implemented method of claim 1, wherein the application-neutral metadata that is modified includes a searchable keyword.

3. The computer-implemented method of claim 1, wherein the plurality of items includes one or more non-file objects.

4. The computer-implemented method of claim 1, wherein the plurality of items includes one or more folders.

5. The computer-implemented method of claim 1, wherein the plurality of items includes a folder and contents of the folder.

6. The computer-implemented method of claim 1, wherein the application-neutral metadata is displayed together with a preview of the item that is selected.

7. A computer-readable memory device storing computer-executable instructions that, when executed by a computing device having an operating system, facilitate operations enabling a user to modify metadata within an operating-system browser comprising:
    displaying a plurality of graphical items that represent a plurality of files stored in the computing system in a first pane of an operating-system shell browser window;
    receiving a selection of a graphical item that is presented in the operating-system browser and that represents one of the plurality of files stored in the computing system;
    in response to the selection, presenting metadata of at least the one of the plurality of files in a second pane of the operating-system shell browser window, wherein the plurality of graphical items remain displayed in the first pane when the metadata is presented in the second pane;
    receiving a user selection of the metadata;
    providing a context menu that is displayed in front of the operating-system shell browser window when the user selection is received, wherein the context menu provides selectable options to modify the metadata and wherein the plurality of graphical items and the metadata remain displayed when the context menu is displayed; and
    responsive to a user input, without opening an application running in the operating system, modifying the metadata to create modified metadata, wherein the modified metadata is application-neutral such that the modified metadata is available to subsequent requesting applications.

8. The computer-readable memory device of claim 7, wherein modifying the metadata includes adding new metadata, editing the metadata that is displayed, or a combination thereof.

9. The computer-readable memory device of claim 7, wherein the user selection is received when a cursor is hovered over the metadata that is displayed.

10. The computer-readable memory device of claim 7, wherein the item includes a file.

11. The computer-readable memory device of claim 7, wherein the item includes a non-file object.

12. A computing device storing computer-executable instructions that, when executed by the computing device having an operating system, generate a graphical user interface, the graphical user interface comprising:
    a display window of an operating-system browser, the display window divided into a first pane, which displays a plurality of graphical items representing a plurality of files, and a second pane, which displays application-neutral metadata of at least a file that has been selected by a user from the plurality of graphical items; and an operating system interface element that is displayed as an overlay in front of the display window when the file is selected and that permits, without invoking an application running in the operating system, user modification of the application-neutral metadata displayed in the second pane, wherein the application-neutral metadata that is modified using the operating system interface element is available to subsequent requesting applications.

13. The computing device of claim 12, wherein the user modification is in response to a user selection of the application-neutral metadata to directly modify the metadata in the second pane.

14. The computing device of claim 12, wherein the user modification includes adding new metadata, editing the application-neutral metadata that is displayed, or a combination thereof.

15. The computing device of claim 12, wherein a user selection of the application-neutral metadata is received when a cursor is hovered over the application-neutral metadata that is displayed in the second pane.

16. The computing device of claim 12, wherein the operating-system browser supports a plurality of item types.

17. The computing device of claim 16, wherein the plurality of item types includes music files, picture files, and document files.

* * * * *